United States Patent
Goodman et al.

(10) Patent No.: US 7,519,668 B2
(45) Date of Patent: Apr. 14, 2009

(54) OBFUSCATION OF SPAM FILTER

(75) Inventors: Joshua T. Goodman, Redmond, WA (US); Robert L. Rounthwaite, Fall City, WA (US); John C. Platt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1036 days.

(21) Appl. No.: 10/601,034

(22) Filed: Jun. 20, 2003

(65) Prior Publication Data

US 2005/0015454 A1 Jan. 20, 2005

(51) Int. Cl.
*G06F 15/16* (2006.01)

(52) U.S. Cl. .................. 709/206; 709/201; 709/223; 713/154; 713/170

(58) Field of Classification Search .......... 709/206, 709/201, 223; 713/212, 154, 170
See application file for complete search history.

(56) References Cited

U.S. PATENT DOCUMENTS

| | | | |
|---|---|---|---|
| 5,377,354 A | 12/1994 | Scannel et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |
| 5,905,859 A | 5/1999 | Holloway et al. |
| 6,003,027 A | 12/1999 | Prager |
| 6,023,723 A | 2/2000 | McCormick et al. |
| 6,047,242 A | 4/2000 | Benson |
| 6,052,709 A | 4/2000 | Paul |
| 6,072,942 A | 6/2000 | Stockwell et al. |
| 6,101,531 A | 8/2000 | Eggleston et al. |

(Continued)

FOREIGN PATENT DOCUMENTS

EP 413 537 2/1991

(Continued)

OTHER PUBLICATIONS

Cynthia Dwork, et al.; "Pricing Via Processing or Combatting Junk Mail"; Presented at Crypto '92: pp. 1-11.

(Continued)

*Primary Examiner*—William C. Vaughn, Jr.
*Assistant Examiner*—Djenane M Bayard
(74) *Attorney, Agent, or Firm*—Amin, Turocy & Calvin, LLP

(57) ABSTRACT

The subject invention provides systems and methods that facilitate obfuscating a spam filtering system to hinder reverse engineering of the spam filters and/or to mitigate spammers from finding a message that consistently gets through the spam filters almost every time. The system includes a randomization component that randomizes a message score before the message is classified as spam or non-spam so as to obscure the functionality of the spam filter. Randomizing the message score can be accomplished in part by adding a random number or pseudo-random number to the message score before it is classified as spam or non-spam. The number added thereto can vary depending on at least one of several types of input such as time, user, message content, hash of message content, and hash of particularly important features of the message, for example. Alternatively, multiple spam filters can be deployed rather than a single best spam filter.

28 Claims, 6 Drawing Sheets

U.S. PATENT DOCUMENTS

| | | | |
|---|---|---|---|
| 6,112,227 A | 8/2000 | Heiner | |
| 6,161,130 A | 12/2000 | Horvitz et al. | |
| 6,167,434 A | 12/2000 | Pang | |
| 6,192,360 B1 | 2/2001 | Dumais et al. | |
| 6,199,102 B1 | 3/2001 | Cobb | |
| 6,266,692 B1 | 7/2001 | Greenstein | |
| 6,308,273 B1 | 10/2001 | Goertzel et al. | |
| 6,314,421 B1 | 11/2001 | Sharnoff et al. | |
| 6,321,267 B1 | 11/2001 | Donaldson | |
| 6,327,617 B1 | 12/2001 | Fawcett | |
| 6,330,590 B1 | 12/2001 | Cotten | |
| 6,370,526 B1 | 4/2002 | Agrawal et al. | |
| 6,393,465 B2 | 5/2002 | Leeds | |
| 6,421,709 B1 | 7/2002 | McCormick et al. | |
| 6,424,997 B1 | 7/2002 | Buskirk, Jr. et al. | |
| 6,434,600 B2 | 8/2002 | Waite et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,416 B1 | 4/2003 | Kirsch | |
| 6,592,627 B1 | 7/2003 | Agrawal et al. | |
| 6,615,242 B1 | 9/2003 | Riemers | |
| 6,633,855 B1 | 10/2003 | Auvenshine | |
| 6,643,686 B1 | 11/2003 | Hall | |
| 6,654,787 B1 | 11/2003 | Aronson et al. | |
| 6,684,201 B1 | 1/2004 | Brill | |
| 6,691,156 B1 | 2/2004 | Drummond et al. | |
| 6,701,440 B1 | 3/2004 | Kim et al. | |
| 6,728,690 B1 | 4/2004 | Meek et al. | |
| 6,732,149 B1 | 5/2004 | Kephart | |
| 6,732,157 B1 | 5/2004 | Gordon et al. | |
| 6,732,273 B1 | 5/2004 | Byers | |
| 6,742,047 B1 | 5/2004 | Tso | |
| 6,748,422 B2 | 6/2004 | Morin et al. | |
| 6,751,348 B2 | 6/2004 | Buzuloiu et al. | |
| 6,757,830 B1 | 6/2004 | Tarbotton et al. | |
| 6,768,991 B2 | 7/2004 | Hearnden | |
| 6,775,704 B1 | 8/2004 | Watson et al. | |
| 6,779,021 B1 | 8/2004 | Bates et al. | |
| 6,842,773 B1 | 1/2005 | Ralston et al. | |
| 6,971,023 B1 | 11/2005 | Makinson et al. | |
| 7,003,555 B1 | 2/2006 | Jungck | |
| 7,051,077 B2 | 5/2006 | Lin | |
| 7,117,358 B2 | 10/2006 | Bandini et al. | |
| 7,155,484 B2 | 12/2006 | Malik | |
| 7,219,148 B2 | 5/2007 | Rounthwaite et al. | |
| 7,263,607 B2 | 8/2007 | Ingerman et al. | |
| 2001/0046307 A1 | 11/2001 | Wong | |
| 2002/0016956 A1 | 2/2002 | Fawcett | |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0184315 A1 | 12/2002 | Earnest | |
| 2002/0194308 A1 | 12/2002 | Hall | |
| 2002/0199095 A1 | 12/2002 | Bandini et al. | |
| 2003/0009698 A1 | 1/2003 | Lindeman et al. | |
| 2003/0016872 A1 | 1/2003 | Sun | |
| 2003/0037074 A1 | 2/2003 | Dwork et al. | |
| 2003/0041126 A1 | 2/2003 | Buford et al. | |
| 2003/0088627 A1 | 5/2003 | Rothwell et al. | |
| 2003/0149733 A1 | 8/2003 | Capiel | |
| 2003/0167311 A1 | 9/2003 | Kirsch | |
| 2003/0191969 A1 | 10/2003 | Katsikas | |
| 2003/0204569 A1 | 10/2003 | Andrews et al. | |
| 2003/0320054 | 10/2003 | Cheng et al. | |
| 2003/0229672 A1 | 12/2003 | Kohn | |
| 2004/0003283 A1 | 1/2004 | Goodman et al. | |
| 2004/0015554 A1 | 1/2004 | Wilson | |
| 2004/0054887 A1 | 3/2004 | Paulsen et al. | |
| 2004/0073617 A1 | 4/2004 | Milliken et al. | |
| 2004/0083270 A1 | 4/2004 | Heckerman et al. | |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0148330 A1 | 7/2004 | Alspector et al. | |
| 2004/0177120 A1 | 9/2004 | Kirsch | |
| 2004/0199585 A1* | 10/2004 | Wang .......................... 709/206 |
| 2004/0199594 A1 | 10/2004 | Radatti et al. | |
| 2004/0210640 A1 | 10/2004 | Chadwick et al. | |
| 2004/0255122 A1 | 12/2004 | Ingerman et al. | |
| 2005/0015455 A1 | 1/2005 | Liu | |
| 2005/0060643 A1 | 3/2005 | Glass et al. | |
| 2005/0076084 A1 | 4/2005 | Loughmiller et al. | |
| 2005/0081059 A1* | 4/2005 | Bandini et al. .............. 713/201 |
| 2005/0091321 A1 | 4/2005 | Daniell et al. | |
| 2005/0114452 A1 | 5/2005 | Prakash | |
| 2005/0120019 A1 | 6/2005 | Rigoutsos et al. | |
| 2005/0160148 A1 | 7/2005 | Yu | |
| 2005/0165895 A1 | 7/2005 | Rajan et al. | |
| 2006/0036701 A1 | 2/2006 | Bulfer et al. | |

FOREIGN PATENT DOCUMENTS

| | | |
|---|---|---|
| EP | 0 720 333 A2 | 7/1996 |
| EP | 720 333 | 7/1996 |
| EP | 1376427 | 3/2003 |
| EP | 1376427 A2 | 1/2004 |
| EP | 1376427 A3 | 1/2004 |
| WO | WO96/35994 | 11/1996 |
| WO | WO 99/01815 A | 1/1999 |
| WO | 9967731 | 12/1999 |
| WO | WO 00/49776 | 8/2000 |
| WO | WO 00/72112 A2 | 11/2000 |
| WO | WO 02/065320 A1 | 8/2002 |
| WO | WO 02/071286 | 9/2002 |
| WO | 03054764 | 7/2003 |
| WO | WO 2004/059506 | 7/2004 |

OTHER PUBLICATIONS

Thorsten Joachims; "Text Categorization with Support Vector Machines: Learning with Many Relevant Features"; LS-8 Report 23, Nov. 1997, 18 pages.

Daphne Koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.

Ellen Spertus; "Smokey: Automatic Recognition of Hostile Messages"; Proceedings of the Conference on Innovative Applications in Artificial Intelligence (IAAI), 1997, 8 pages.

Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.

Yiming Yang, et al.; "A Comparative Study on Feature Selection in Text Categorization"; School of Computer Science, Carnegie Mellon University, Pittsburgh, PA, and Verity, Inc., Sunnyvale, CA; 9 pages.

Yiming Yang, et al.; "An Example-Based Mapping Method for Text Categorization and Retrieval"; ACM Transactions on Information Systems, vol. 12, No. 3, Jul. 1994, pp. 252-277.

David D. Lewis, et al.; "A Comparison of Two Learning Algorithms for Text Categorization"; Third Annual Symposium on Document Analysis and Information Retrieval; Apr. 11-13, 1994; pp. 81-93.

Mehran Sahami; "Learning Limited Dependence Bayesian Classifiers"; In KDD-96: Proceedings of the Second International Conference on Knowledge Discovery and Data Mining; AAAI Press, 1996; Menlo Park, CA; pp. 335-338.

William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.

Makoto Iwayama, et al.; "Hierarchical Bayesian Clustering for Automatic Text Classifiations"; Natural Language; 1995; pp. 1322-1327.
David D. Lewis; "An Evaluation of Phrasal and Clustered Representations on a Text Categorization Task"; 15th Annual International SIGIR '92; Denmark 1992; pp. 37-50.
Daphne Koller, et al.; "Toward Optimal Feature Selection"; Machine Learning; Proc. of the Thirteenth International Conference, Morgan Kaufmann, 1996, 9 pages.
David Dolan Lewis; "Representation and Learning in Information Retrieval"; University of Massachusetts, 1992.
Tom Mitchell; "Machine Learning"; Carnegie Mellon University, Bayesian Learning, Chapter 6, pp. 180-184.
Y. H. Li, et al.; "Classification of Text Documents"; Department of Computer Science and Engineering, Michigan State University, E. Lansing, Michigan, The Computer Journal, vol. 41, No. 8, 1998; 537-546.
Juha Takkinen, et al.; "CAFE: A Conceptual Model for Managing Information in Electronic Mail"; Laboratory for Intelligent Information Systems, Department of Computer and Information Science, Linkoping University, Sweden, Conference on System Sciences, 1998 IEEE.
Jacob Palme, et al.; "Issues When Designing Filters In Messaging Systems"; Department of Computer and Systems Sciences, Stockholm University, Royal Institute of Technology, Skeppargarten 73, S-115 30, Stockholm, Sweden, Computer Communications; 1996; pp. 95-101.
Richard B. Segal, et al., "SwiftFile: An Intelligent Assistant for Organizing E-Mail"; IBM Thomas J. Watson Research Center.
Mehran Sahami, et al., "A Bayesian Approach to Filtering Junk E-Mail"; Stanford University.
David Madigan, "Statistics and The War on Spam," Rutgers University, pp. 1-13, 2003.
Padraig Cunningham, et al., "A Case-Based Approach to Spam Filtering that Can Track Concept Drift," Trinity College, Dublin, Department of Computer Science, May 13, 2003.
Mark Rosen, "E-mail Classification in the Haystack Framework," Massachusetts Institute of Technology, Feb. 2003,
Kevin R. Gee, Using Latent Semantic Indexing to Filter Spam, Dept. of Computer Science and Engineering, University of Texas-Arlington, 5 pages.
Thorsten Joachims, Transductive Inference for Text Classification Using Support Vector Machines, In Proceedings of the 16th International Conference on Machine Learning, 1999, pp. 200-209, San Francisco, USA.
D. Turner et al., Payment-based Email. 5th International Conference on Software Engineering, Artificial Intelligence, Networking, and Parallel/Distributed Computing, Jun. 2004. 7 pages.
D.A. Turner et al., Controlling Spam through Lightweight Currency. In Proc. of the Hawaii International Conference on Computer Sciences, Jan. 2004. 9 pages.
Fabrizio Sebastiani. Machine Learning in Automated Text Categorization. ACM Computing Surveys, vol. 34 Issue 1, pp. 1-47, 2002.
I. Androutsopoulos, et al. Learning to Filter Spam E-mail: A Comparison of a Naive Bayesian and a Memory-based Approach. 4th PKDD's Workshop on Machine Learning and Textual Information Access, 2000. 13 pages.
I. Androutsopoulos, et al., An Experimental Comparison of Naive Bayesian and Keyword-based Anti-spam Filtering with Personal E-mail Messages. Proceedings of the 23rd ACM SIGIR Conference, pp. 160-167, 2000.
P. Pantel, et al., SpamCop: A Spam Classification & Organization Program. In Proc. AAAI-1998 Workshop on Learning for Text Categorization, 1998. 8 pages.
G. Manco, et al., Towards an Adaptive Mail Classifier. In Proc. of Italian Association for Artificial Intelligence Workshop, 2002. 12 pages.
Cormac O'Brien, et al., Spam Filters: Bayes vs. Chi-squared; Letters vs. Words, Proceedings of the 1st international symposium on Information and communication technologies, 2003, pp. 291-296, Dublin, Ireland.
Olle Balter, et al., Bifrost Inbox Organizer: Giving users control over the inbox, NordiCHI Oct. 2, 2002, pp. 111-118, Arhus, Denmark.

Lorrie Faith Cranor, et al., Spam!, Communications of the ACM, 1998, pp. 74-83, vol. 41-No. 8.
John Wong, Preventing Spams and Relays, Linux Journal, Dec. 1998, 6 pages, vol. 1998 Issue 56es. Specialized Systems Consultants, Inc.
Meng Weng Wong, SPF Overview, Linux Journal, Apr. 2004, 6 pages, vol. 2004 Issue 120, Specialized Systems Consultants, Inc.
Stop, in the Name of Spam, Communications of the ACM, Nov. 1998, pp. 11-14, vol. 41 No. 11, ACM.
Eric Allman, Spam, Spam, Spam, Spam, Spam, the FTC, and Spam, Queue, Sep. 2003, pp. 62-69, vol. 1 Issue 6, ACM.
Tom Fawcett, "In vivo" Spam Filtering: A Challenge Problem for KDD, SIGKDD Explorations, Dec. 2003, pp. 140-148, vol. 5 Issue 2, ACM.
J.D.M. Rennie, ifile: An Application of Machine Learning to E-Mail Filtering. Proceedings of the KDD-2000 Workshop on Text Mining, Sixth ACM SIGKDD International Conference on Knowledge Discovery and Data Mining, 2000. 6 pages.
S. Argamon, et al., Routing documents according to style. In First International Workshop on Innovative Information Systems, 1998. 8 pages.
K. Mock, An Experimental Framework for Email Categorization and Management. Proceedings of the 24th Annual International ACM SIGIR Conference, pp. 392-393, 2001.
Jose Maria Gomez Hidalgo, Evaluating Cost-Sensitive Unsolicited Bulk Email Categorization, SAC 2002, 2002, pp. 615-620, ACM, Madrid, Spain.
A.Z. Broder, et al. Syntactic Clustering of the Web. SRC Technical Note, Digital Corporation, Jul. 25, 1997. 13 pages.
P.Y. Simard, et al., Using Character Recognition and Segmentation to Tell Computer from Humans. International Conference on Document Analysis and Recogntion (ICDAR), IEEE Computer Society, Los Alamitos, pp. 418-423, 2003.
S. Li et al., Secure Human-Computer Identification against Peeping: A Survey. Technical Report, Microsoft Research, 2003. 53 pages.
European Search Report, EP31087TE900, mailed Nov. 11, 2004.
J. Byrne, My Spamblock, Google, Jan. 19, 1997, 2 pages.
D. F. Skoll, How to Make Sure a Human is Sending You Mail, Google, Nov. 17, 1996, 2 pages.
L. M. Bowman, Hotmail Spam Filters Block Outgoing E-Mail, CNET NEWS.COM, Jan. 18, 2001, 3 pages.
Partial European Search Report, EP33823TE900kap, mailed Jun. 21, 2005.
Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.
Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.
Graham, P., The Future of Spam, Computer Security Journal, CSI Computer Security Institute, vol. 19, No. 1, Jan. 2003, pp. 1-5.
Graham, P., A Plan for Spam, Online!, Aug. 2002, XP002273602, http://www.paulgraham.com/spam.html, retrieved on Mar. 12, 2004.
Breiman, Friedman, Olshen, and Stone. "Classification and Regression Trees." Wadsworth & Brooks, Monterey, CA (1984).
Quinlan. "C4.5: Programs for Machine Learning." Morgan Kaufmann, San Francisco, CA (1993).
European Search Report, dated Jun. 9, 2005, mailed Aug. 22, 2005 for European Patent Application Serial No. EP04011978, 12 pages.
Hayes, Brian."Spam, Spam, Spam, Lovely Spam." American Scientist Online, Jun. 30, 2003. pp. 1-6. vol. 91.
European Search Report, dated Aug. 4, 2005, mailed Aug. 16, 2005, for European Patent Application Serial No. EP 04 01 1979, 6 pages.
International Search Report dated Jan. 17, 2006, mailed Jan. 31, 2006, for PCT Application Serial No. PCT/US04/05501. 2 Pages.
Written Opinion of the International Preliminary Examining Authority mailed Nov. 30, 2005 for PCT/US03/41526, 5 pages.
U.S. Appl. No. 10/208,150, filed Jul. 29, 2002, Andaker.
U.S. Appl. No. 09/893,941, filed Jun. 28, 2001, Horvitz.
U.S. Appl. No. 10/278,591, filed Oct. 23, 2002, Heckerman.
U.S. Appl. No. 10/180,565, filed Jun. 26, 2002, Goodman.
U.S. Appl. No. 09/497,992, filed Feb. 4, 2000, Maller.

U.S. Appl. No. 10/291,260, filed Nov. 8, 2002, Burrows.

European Search report dated Feb. 23, 2007, mailed Feb. 28, 2007 for European Patent Application Serial No. 05105308, 4 pages.

European Search Report dated Jul. 5, 2006, mailed Jul. 24, 2006 for European Application No. EP 06 01 2631, 3 pages.

European Search Report dated Apr. 6, 2006 and mailed Apr. 6, 2006 for EP 04102242, 3 pages.

Graham. "The Future of SPAM" (2003) Computer Journal, CSI Computer Security Institute, vol. 19, No. 1, 6 pages.

Federal Trade Commission. "False Claims in Spam", A report by the FTC's division of marketing practices, Apr. 30, 2003, http://www.ftc.gov/reports/spam/030429spamreport.pdf.

Hansell. "Internet is losing ground in battle against spam", The New York Times: Technology section, Apr. 22, 2003.

\* cited by examiner

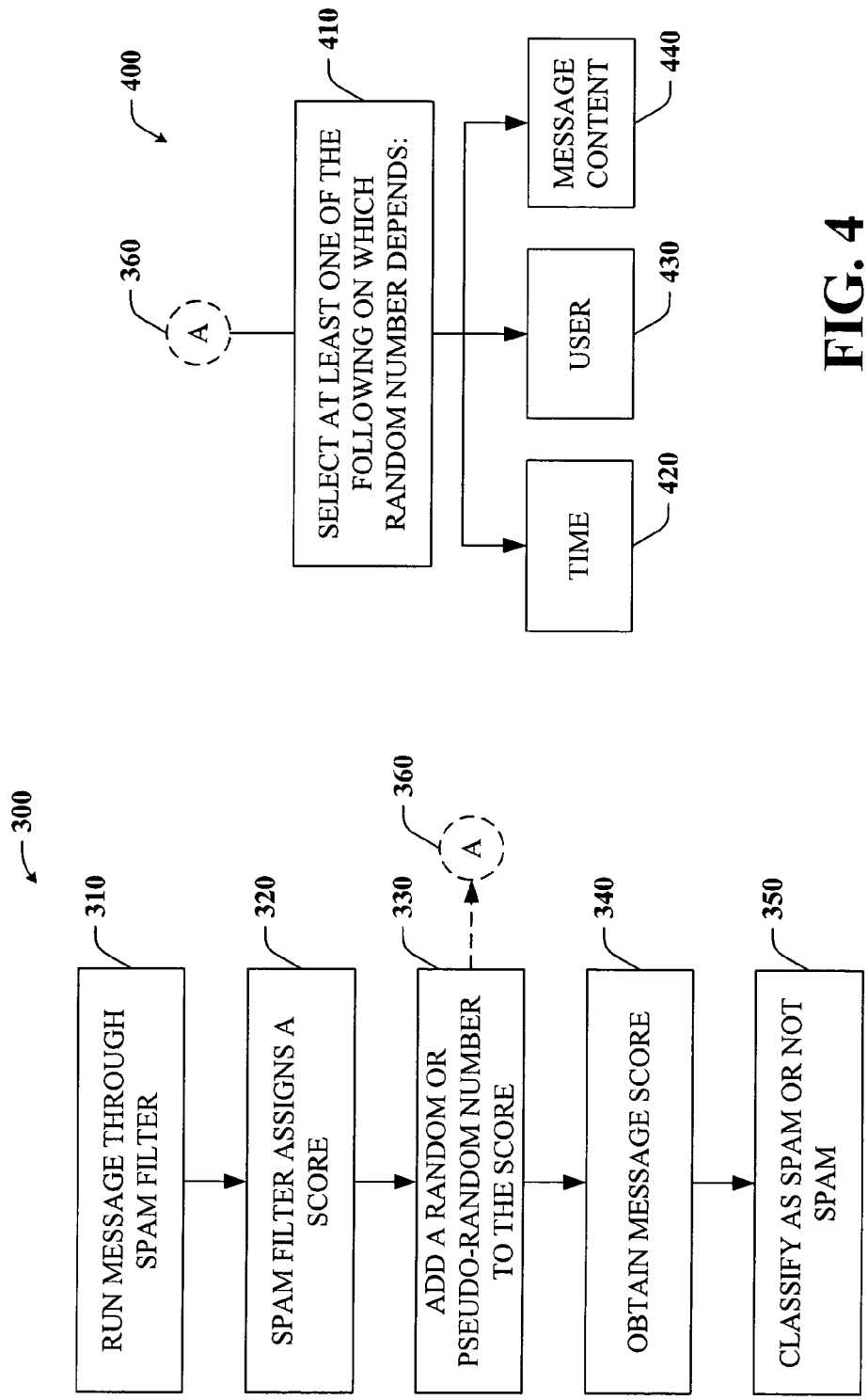

OBFUSCATION OF SPAM FILTER

TECHNICAL FIELD

This invention is related to systems and methods for reducing the transmission of spam, and in particular to hindering reverse engineering of a spam filter and/or to mitigating modeling and prediction of spam filter performance by spammers.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

Common techniques utilized to thwart spam involve the employment of filtering systems/methodologies. One proven filtering technique is based upon a machine learning approach. Machine learning filters assign to an incoming message a probability that the message is spam. In this approach, features typically are extracted from two classes of example messages (e.g., spam and non-spam messages), and a learning filter is applied to discriminate probabilistically between the two classes. Since many message features are related to content (e.g., whole words and phrases in the subject and/or body of the message), such types of filters are commonly referred to as "content-based filters". These types of machine learning filters usually employ exact match techniques in order to detect and distinguish spam messages from good messages.

Unfortunately, spammers constantly are finding ways around conventional spam filters including those that employ machine learning systems. For example, they may utilize mathematical processing and sequential email modification to test and predict spam filter performance. In addition, much information is available to the public which explains how common spam filters operate. Some internet services even offer to run messages through specific filters and to return the respective verdicts of those filters. Thus, spammers have the opportunity to run their spam through various known spam filters and/or modify their messages until they successfully pass through the filter. In view of the foregoing, such conventional filters provide limited protection against spam.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Traditional machine learning spam filters can be reverse engineered by spammers, which can allow them to find messages that do not get caught by the filter. In addition, when spam filters always catch the same messages regardless of the user, spammers can use trial and error to easily find a message that gets through. After finding that message, they can exploit the filter by sending it out to potentially millions of people. Without modifying the spam filter in some way, this form of spammer trickery can continue indefinitely.

The subject invention provides systems and methods that facilitate obfuscating a spam filter, thereby making it more difficult for spammers to reverse engineer and/or more difficult for them to find a message that consistently gets through the filter. Essentially, the instant invention provides a manner to modify the behavior of a spam filter, which can be accomplished in part by adding elements of randomization to a spam filtering process.

The majority of conventional spam filters process a message and return some sort of score for the message. This could be the probability of the message, an arbitrary score, the log of the probability of the message, a degree of match between the current message and a non-spam message, or any other number. Scores above a certain threshold are labeled as spam in some way. Such labels include but are not limited to delete, move to a special folder, challenge, and/or mark. Thus, one approach to modifying the behavior of the spam filtering process involves randomizing the scores of messages. Randomization includes, but is not limited to, adding some number to the score and/or multiplying the score by some factor such as 1.1 or 0.9, for example.

A second approach to performing the randomization involves using time. More specifically, a random number added to the message score changes with and/or depends on the current time of day or current time increment. For example, the randomization can be programmed to use a different random number every 15 minutes or any other time increment that is desirable. Alternatively, the random number can change as the time of day changes. As a result, a spammer will find it more difficult, for example, to determine whether a message that is close to a threshold (e.g., of being considered spam or non-spam) and changes from being blocked to getting through after a small (e.g. minor) modification, has changed because of the modification or because of the random factor.

A third approach to randomizing the filter depends in part on the user and/or domain receiving the message. For instance, by employing a random number that depends on the user, a spammer could find a message that gets through only to his test user but not to other users. Therefore, it would be more costly to the spammer to test his messages.

Message content is another aspect of randomization according to the present invention. For example, a random number can be computed based at least in part upon the contents of the message. A related technique is hashing. A hash of a message is a pseudo-random number deterministically generated from the contents, such that small changes to the contents result in large changes to the hash. If a spammer attempts to reverse engineer the message, small changes in the message contents could result in relatively large changes to the message score. Alternatively or in addition, particular features of the message whose contributions to the score of a message are above a threshold can be extracted and hashed. This hash can then be used as input to a random number generator, thereby making it more difficult to find the contributions of the features that are most important.

It should be further noted that while randomization can be added to the process of spam filtering, it is important to do so in a controlled manner. In particular, if a spam filter occasionally let through messages that were obviously spam, then legitimate users could be upset. Conversely, if messages that are obviously good were occasionally tagged as spam then legitimate users could again be upset. Thus, the subject invention facilitates affecting messages that are "near" the edge of spam or not spam. In other words, the randomization of the filtering process does not substantially affect messages that are either obviously spam or obviously not spam. Rather, it impacts the filtering of messages that are near and/or at the threshold between non-spam and spam.

Lastly, instead of using a single best spam filter, multiple spam filters can be employed to hinder the modeling and prediction of spam filter performance by spammers. Using multiple spam filters forces different aspects of the message to be examined before classifying it as spam or non-spam. Thus, a spammer who reverse engineers one filter, or finds a message that gets through one filter, will not necessarily get through a different one. Furthermore, selecting which filter is used to process and classify messages can involve any one or a combination of the randomization techniques described hereinabove.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 3 is a flow diagram of an exemplary method that facilitates obfuscating a spam filtering process in accordance with an aspect of the present invention.

FIG. 4 is a flow diagram of an exemplary method that facilitates determining a random or pseudo-random number in accordance with an aspect of the present invention.

DETAILED DESCRIPTION OF THE INVENTION

Figure 1:
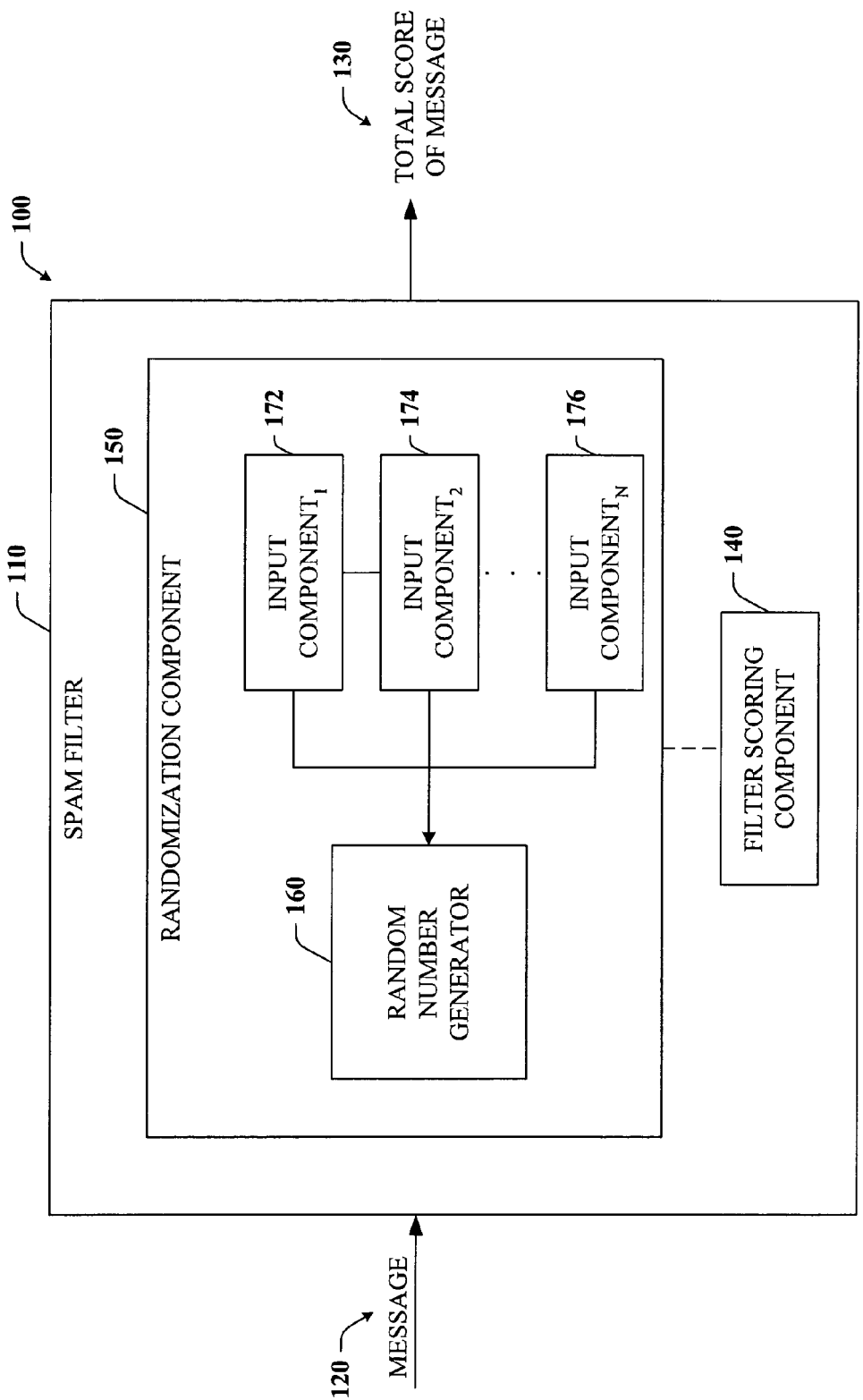
FIG. 1 is a general block diagram of a system that facilitates obscuring a spam filtering process in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above. In this particular application, a filter could be trained to automatically filter particular message content (text and images) in order to capture and tag as junk the undesirable content (e.g., commercials, promotions, or advertisements). Another exemplary application is SMS messages on cellular phones or similar devices.

One of the many purposes of obscuring the inner workings of a spam filter is to prevent the spammer from finding a message that is almost always guaranteed to get through without knowledge of how the filter functions. Another purpose is to mitigate the spammer from understanding the workings of the spam filter to hinder any attempts by the spammer to reverse engineer the filter. This is particularly applicable to messages that are near the edge of spam where such a slight change to the message (e.g. adding or removing certain words or features from the message) affects whether the filter "sees" the message as spam. For example, if a spammer could learn that messages with a certain word, such as "Viagra" are always classified as spam, he/she can supply craft messages without this word. Hence, it would be advantageous to construct a spam filter or spam filtering system that essentially precludes reverse engineering attempts.

Many spam filters use linear models. In a linear model, features of a message are extracted, such as the words in the message, as well as any special features such as whether the message was sent in the middle of night. Associated with each feature is a weight or score. The sum of all weights associated with the message is computed to yield a total weight (e.g. summedscore). If the total weight exceeds some threshold, then the particular message does not get through or rather, is blocked from delivery. Conversely, if the total weight falls below some threshold, then the message can get through to the recipient.

Other types of models can be used in spam filters such as running a score through a sigmoid function having the following formula:

$$finalscore = \frac{1}{1 + e^{-summedscore}}$$

which translates the score into a number between 0 and 1 (e.g., referred to as the finalscore). This number can be further translated into a probability which can facilitate determining whether the message is spam.

However, regardless of the model or strategy employed in the spam filter, the spammer may attempt to determine the scoring scheme associated with at least one feature extracted from a message. He/she may do this by creating a large number of messages with different features to see which messages are classified as spam (e.g., blocked from delivery) and which messages are not classified as spam (e.g. delivered to recipients). Finally, the spammer may try to deduce what feature scores would lead to such classifications.

One approach to mitigating this type of spammer behavior involves modifying at least one of the various scores associated with a message in some small manner to effectively add noise to the real score(s) associated with the message. Modifying the scores can be accomplished in part by randomizing either the summedscore or the finalscore, or both. For example, in a typical spam filter, the finalscore of a message can be compared to some (probability) threshold to determine whether that message is spam or more spam-like than not. Hence, by modifying the finalscore by adding or multiplying it by a random or pseudo-random number, the value of the finalscore effectively increases or decreases by some small amount such that when it is compared to some threshold, it may now exceed the threshold, whereas previously, it may have fallen below the threshold. Thus, the message could now be tagged as spam or potential spam due to the slight change in its overall score.

Alternatively, a similar form of modification can be performed with respect to the summedscore value since its value has an impact on whether the finalscore exceeds a threshold. Thus, if either the summedscore threshold or the finalscore threshold is reached, then the message most likely does not get through. Moreover, adding noise to the scores of messages near the threshold of spam or non-spam makes it harder for a spammer to determine whether the current status of their message (e.g. spam/non-spam blocked/delivered) is due to some randomization feature or due to some change in the message content.

Referring now to FIG. 1, there is illustrated a general block diagram of a spam filtering system 100 that facilitates obscuring the functionality of a spam filter in accordance with an aspect of the present invention. The system 100 comprises a spam filter 110 whereby a message 120 can be processed by the spam filter to yield a score of the message 130, which ultimately determines whether the message is classified as spam (or spam-like) or non-spam (non-spam-like).

More specifically, the spam filter 110 comprises a filter scoring component 140 and a randomization component 150 operatively coupled thereto. The filter scoring component 140 can employ a machine learning system which assesses the probability that the message 120 is spam or not. The filter can look at particular features of the message in order to provide its assessment of the message. For example, features relating to any origination information as well as features relating to particular content of the message (e.g., embedded images, URLs, words and/or phrases characteristic of spam) can be extracted and analyzed. The resulting score can then be modified at least in part by the randomization component 150.

The randomization component 150 comprises a random number generator 160 which can receive input from one or more input components 170 (e.g. INPUT COMPONENT$_1$ 172, INPUT COMPONENT$_2$ 174, up to INPUT COMPONENT$_N$ 176, where N is an integer greater than or equal to one) to effect a small or slight increase or decrease in the value of the resulting score (e.g., summedscore and/or finalscore if sigmoid function utilized).

Input from the input components 170 can be in the form of adding some random or pseudo-random number to each score before classifying the message as spam or non-spam. In this way, the score of a message is changed, and a spammer who finds a message that gets through a filter may only have found a message that gets through at one time due to a favorable random number. For example, imagine that the random number added to a particular spam message is 0.7. In the case of this particular message, the addition of 0.7 has little impact on the classification of the spam message, and thus, the message is allowed to get through. The spammer may then model future spam after this message. However, unbeknownst to the spammer, these future spam messages may not get through since the random number added thereto can change at any time. Moreover, the spammer will have difficulty in determining why the earlier message got through but the more recent spam messages are not getting through.

On the other hand, imagine that the random number is 1. This random number may be high enough to act unfavorably to the particular spam message. In other words, by adding the number 1 to the spam message's score, the total or overall score of the message may now exceed some threshold. As a result, the message is classified as spam and not allowed to get through the filter. Accordingly, adding a random or pseudo-random number makes it harder to reverse engineer the filter since the scores of a message and whether it is classified as spam may or may not change coincidentally with minor modifications to the message. Hence, the sender is left uncertain as to whether the message got through this time because of a minor modification to the message or because of a favorable random number.

Another form of input can involve the use of time. For instance, by computing a random number that depends on the day or the hour, the spammer must perform his classification over a longer time period to reverse engineer the filter. In some cases, the filter can be automatically updated on a regular basis, such as every day, so a filter with the randomization component 150 that changes every 4 hours, for example, can itself change before the spammer can reverse engineer it. That is, the random number generator 160 can be programmed to employ a different random number at various time increments such as 5-minute, 10-minute. 1-hour, and/or 4-hour increments, for instance.

Furthermore, the spammer may find that a message is getting through now at a first time increment. Immediately thereafter, the spammer could send out a few more copies of that message to further "test" the filter. Upon seeing that those messages get through, the spammer may then send out millions of that message. However, by the time that occurs, the randomization component 160 has moved to another input component 170 and thus to another time increment (e.g., second time increment). Hence, at the second time increment, a different random number is added, thereby adversely affecting those messages near the edge of spam, or rather, the messages that were once classified as non-spam due to the previous random number. As a result, spammers who have some success in getting a small percentage of their messages through the filter cannot readily determine if a slight change to their messages got them through the filter or if their random number changed.

Yet another type of input that can influence a random number generated by the randomization component 150 involves the user and/or domain receiving the message and/or the domain of where the spam filter is running. In particular, the random number generated can depend at least in part on the recipient of the message. For example, a spammer's test user can be recognized by at least a portion of its identification information such as its email address, its display name, and/or its domain. Thus, the random number generated for the spammer's test user can be small enough to allow the spam messages to get through to the test user almost every time.

On the contrary, other domain names and/or other users indicated to receive the message(s) can cause the random number generated to be high enough to block the spammer's messages from getting through to them. Thus, the spammer may find a message that gets through to his test user(s) but not to other users. If the spammer is unaware that only his test users are receiving his spam, then the spammer will be tricked into modeling future spam messages after the messages that got through only to his test users. As a result, the amount of spam sent to other non-test users decreases. However, by causing the random number generated to depend at least in part on some aspect of the recipient of the message, it becomes more expensive for the spammer to test spam filters. Alternatively or in addition, input can be based at least in part upon the message content. This can be useful for mitigating the spammer from reverse engineering a spam filter's inner workings. More specifically, a random number is computed based on the message contents. That is, a hash of the message contents is obtained. Hashing is the transformation of a string of characters into a usually shorter-fixed length value or key that represents the original string. In the present example, the hash value computed for each message is a random number.

Spammers often try to slightly modify the contents of their messages to get around spam filters. Thus, when a spammer tries to reverse engineer the message, small changes in the message contents can result in relatively large changes in the score of the message. For instance, imagine a message "X" is classified as spam. The spammer adds a word such as "FREE!!!" that effectively makes the message more spam-like. However, due to the randomization aspect in accordance with the instant invention, the spammer believes that the message might now be classified as non-spam. Unfortunately, the spammer mistakenly concludes that the word "FREE!!!" makes the message less spam-like, when in fact the reverse is true.

To counter the potential adverse treatment of their messages in light of randomization based on message content, spammers may attempt to add random words that they believe are unlikely to affect the message such as "the" or "on", for example. As a result, the spammers could have many messages classified after changing only these words, and then could compute an average to determine which types of modifications to their messages have the most success in getting through the filter.

In anticipation of such spammer behavior, a hash of the features which substantially contribute to the score of the message can be computed. More specifically, recall that features can be extracted from a message. From the many features extracted, the features whose contributions exceed a given threshold (e.g., a threshold of 0.01) can be selected. A hash of the selected features can then be calculated and that hash can be used as input to the random number generator 160. Because it is relatively difficult for spammers to find which features of a message contribute the most to a message score, spammers will have great difficulty in reverse engineering the functionality of this type of spam filter.

Alternatively or in addition, a hash of the sender's alleged IP address can be computed to determine what random number is generated for that message. Thus, once again, it is especially difficult for the spammer to determine what feature of the message is used to determine the hash and then to determine what random number corresponds to the hash.

Once the randomization component 150 outputs a random number for a particular message, the random number can be added, for example, to the score or weight assessed by the filter scoring component 140. Finally, the total or final score of the message 130 can be obtained to facilitate classification of the message as spam or non-spam.

Rather than having a random function that is added to a message score to obscure the functioning of a spam filter, multiple spam filters can be deployed across multiple domains and/or for multiple users. In particular, a user could randomly or non-randomly select one or more spam filters to use for classifying his messages. The filters themselves can be different types of spam filters and/or trained using different sets of training data. Thus, a spammer would most likely experience great difficulty in deciphering which filters are employed by a particular recipient of its spam messages. Moreover, more than one filter at a time can be involved in classifying messages, thereby making it nearly impossible to find one message that gets through the filters nearly every time.

Figure 2:
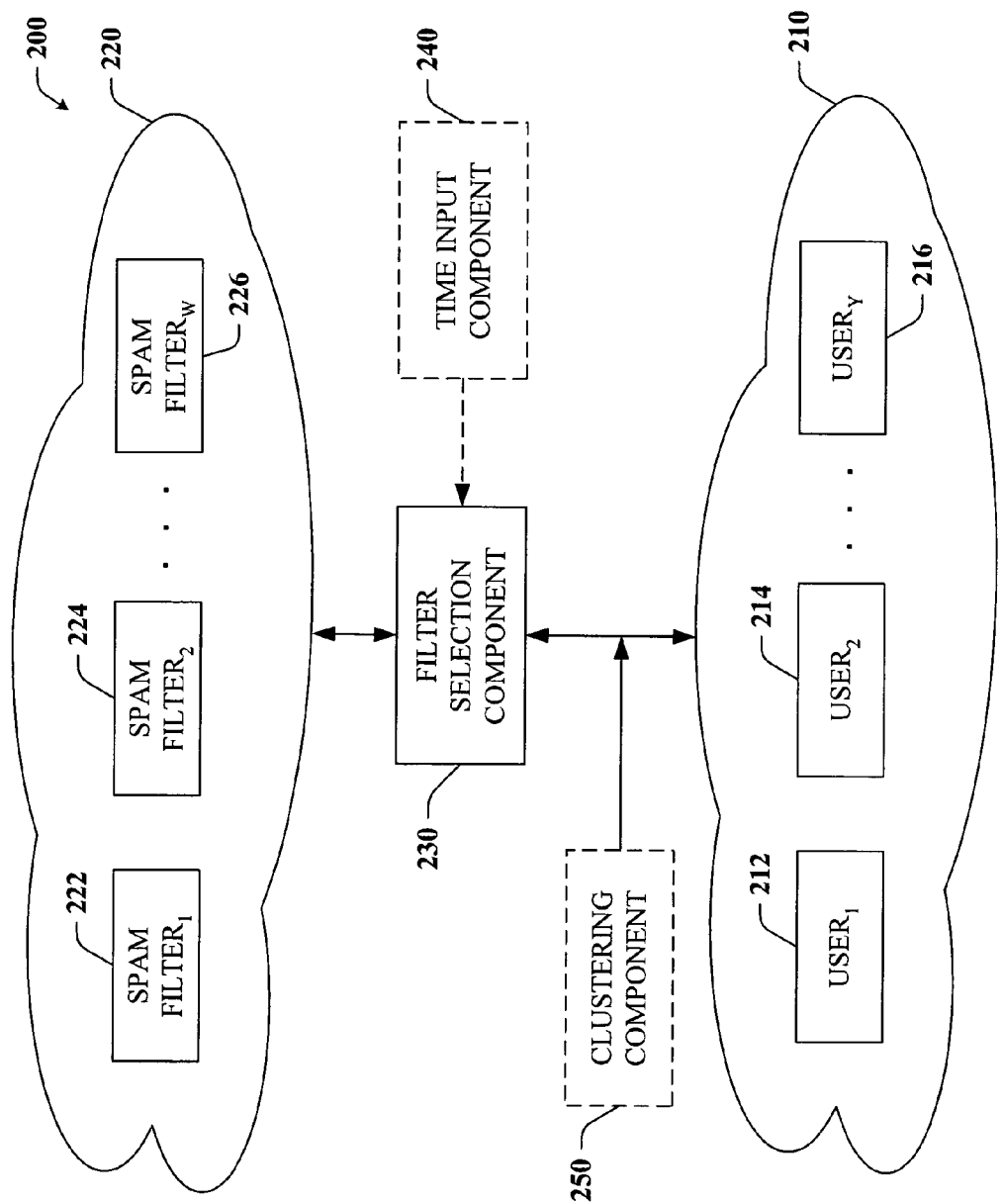
FIG. 2 is a general block diagram of a system that makes use of multiple filters to facilitate obscuring a spam filtering process in accordance with an aspect of the present invention.

FIG. 2 illustrates a block diagram of an exemplary multi-filter spam filtering system 200 in accordance with an aspect of the present invention. The system 200 comprises a plurality of users 210 (e.g., $USER_1$ 212, $USER_2$ 214, and/or up to $USER_Y$ 216, where Y is an integer greater than or equal to one). The users 210 are generally the recipients of any incoming messages, including spam messages. The system 200 also comprises a plurality of spam filters 220 (e.g. SPAM FILTER$_1$ 222, SPAM FILTER$_2$ 224, and/or up to SPAM FILTER$_W$ 226, where W is an integer greater than or equal to one).

Each spam filter 220 can be trained based at least in part on different sets of training data. More specifically, a first filter 212 can be trained via a machine learning system using a first subset of training data. Likewise, a second filter 214 can be trained in a similar manner using a second subset of training data that may or may not partially overlap with the data of the first subset. For example, the first filter 212 comprises common terms and a second filter 214 comprises uncommon terms. Employing both filters means that the filters will examine different criteria or features or content in the message before classifying the message as spam or not.

In a similar manner, certain data can be excluded from the training of the one or more filters 210 as desired by a user. The excluded data can be excluded according to a random number generator. In addition, some features of messages that are extracted and used to create the training data can be assigned particular values. Thus, the spam filters 220 can be user-specific or personalized to various degrees of customization depending in part on user preferences and instructions.

Thereafter, a filter selection component 230 operatively coupled to the plurality of users 210 and to the plurality of spam filters 220 can communicate with the users 210 in order to select one or more filters 220 based at least in part upon the particular user and/or upon the user's selection. Alternatively, filter selection can be random or based at least in part on a hash of the message contents or on a size of a message.

As shown in the figure, filter selection can also be based in part on input received from a time input component 240. That is, different filters can be operational at different times of the day. For instance, if a message is sent at 2 o'clock in the afternoon, the plurality of filters 220 are available for use. However, if the message is sent at 3 o'clock in the morning, only a subset of the filters 220 are available for use such as the first, second, fourth and sixth filters, for example. Alternatively only a single filter is used, with the choice of which filter depending on the time of day.

In addition to the above, the users 210 can be clustered into sub-groups by a clustering component 250 based on some similar qualities or characteristics or type. Likewise, training data can be clustered in a similar manner, thereby resulting in filters trained on at least one cluster or type of data. Hence the filter selection component 230 can select one or more spam filters 220 corresponding to the particular cluster of users. Employing multiple filters in a random or non-random fashion as described herein can be more beneficial to spam filtering in general instead of relying on a single best spam filter. Reverse engineering, predicting spam filter performance, and finding a single message that gets through every time are more difficult for the spammer since one message may get through now, but as different filters are selected in a random or non-random manner, the same or similar message may not necessarily get through the next time. However, determining why the message does not get through every time or the next time it is sent is much more difficult, if not unfeasible, for the spammer since the inner-workings of the filter(s) cannot be readily reverse-engineered and/or predicted. Moreover, a small amount of messages near the edge of spam may get through but a majority of near "spam" messages can be effectively blocked from delivery by obfuscating the spam filtering process.

Various methodologies in accordance with the subject invention will now be described via a series of acts, as demonstrated in FIGS. 3-8. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with the present invention.

Turning now to FIG. 3, there is illustrated a flow diagram of an exemplary process 300 for performing a randomization of a spam filter-generated message score in accordance with an aspect of the present invention. The process 300 can begin at 310 wherein a message is run through a spam filter. At 320, the spam filter assigns a score to the message. The score can be based on generic spam filtering systems and methods such as by extracting one or more features of the message, whereby each feature has a weight associated therewith. The sum of the weights is calculated to yield the score of the message. However, before the message is classified as spam or non-spam, a random or pseudo-random number can be added to the score at 330 to mitigate reverse engineering of the spam filtering process.

A final score of the message is obtained at 340; and the message is classified thereafter at 350 as spam or non-spam. The random or pseudo-random number added to the original score given by the spam filter effectively adds noise to the original score in order to mitigate spammers from reverse engineering the spam filter and/or from finding a message that can consistently get passed the spam filter. In either case, if the spammer knew how the spam filter operated or could predict the spam filter's response, he could easily construct messages that would get through the spam filter substantially every time. However, by incorporating a randomization component into the spam filter(s), the spammer has a hard time to establish if either a seemingly minor alteration to the message or some feature of the filter caused the message to change from "spam" to "non-spam" status (or vice versa); thereby making it not nearly impracticable to reverse-engineer the spam filter(s).

The random number or factor alters the message score just enough to affect messages near the edge of spam. That is, messages which lie along the line between spam and non-spam messages are the most affected by this randomization approach. Other messages which are clearly spam (e.g., very high score or probability) or clearly not spam (e.g., very low score or probability) are not substantially affected by the randomization of the score. Furthermore, a purely random number added to a message score each time is not as effective as the present invention, since eventually, the spammer could ascertain the probability or an average probability of his message getting through the filter and thus either reverse engineer the filter or find a message that always gets through the filter, and/or both.

The randomization of the score can depend on one or more types of input as indicated at 360 of FIG. 3, which refers to FIG. 4. In FIG. 4, a flow diagram of an exemplary process 400 for determining what random number is utilized is illustrated. At 410, the process 400 involves selecting at least one of the following types of input on which the random number depends: time 420, user 430, and/or message content 440.

Time 420 refers to a time increment or a time of day. More specifically, the random number employed can change depending on the time increment utilized, such as 5 minutes, 10 minutes. 30 minutes. 2 hours. etc. for example, or on the time of day. For instance, the value of the random number may change at midnight and then again 5:00 a.m., again at 7:30 a.m., again at 11:00 a.m. again at 4:13 p.m. etc.

The identity of the user 430 (e.g., display name, email address) and/or the user's domain and/or the domain receiving or sending the message can also be used to influence which random number is used. When this tactic is implemented, spammers have greater difficulty in testing spam filters to determine which messages get through to which users. Finally, the message content 440 or at least a portion thereof can determine what random number is added to the original (base) score.

Figures 5, 6:
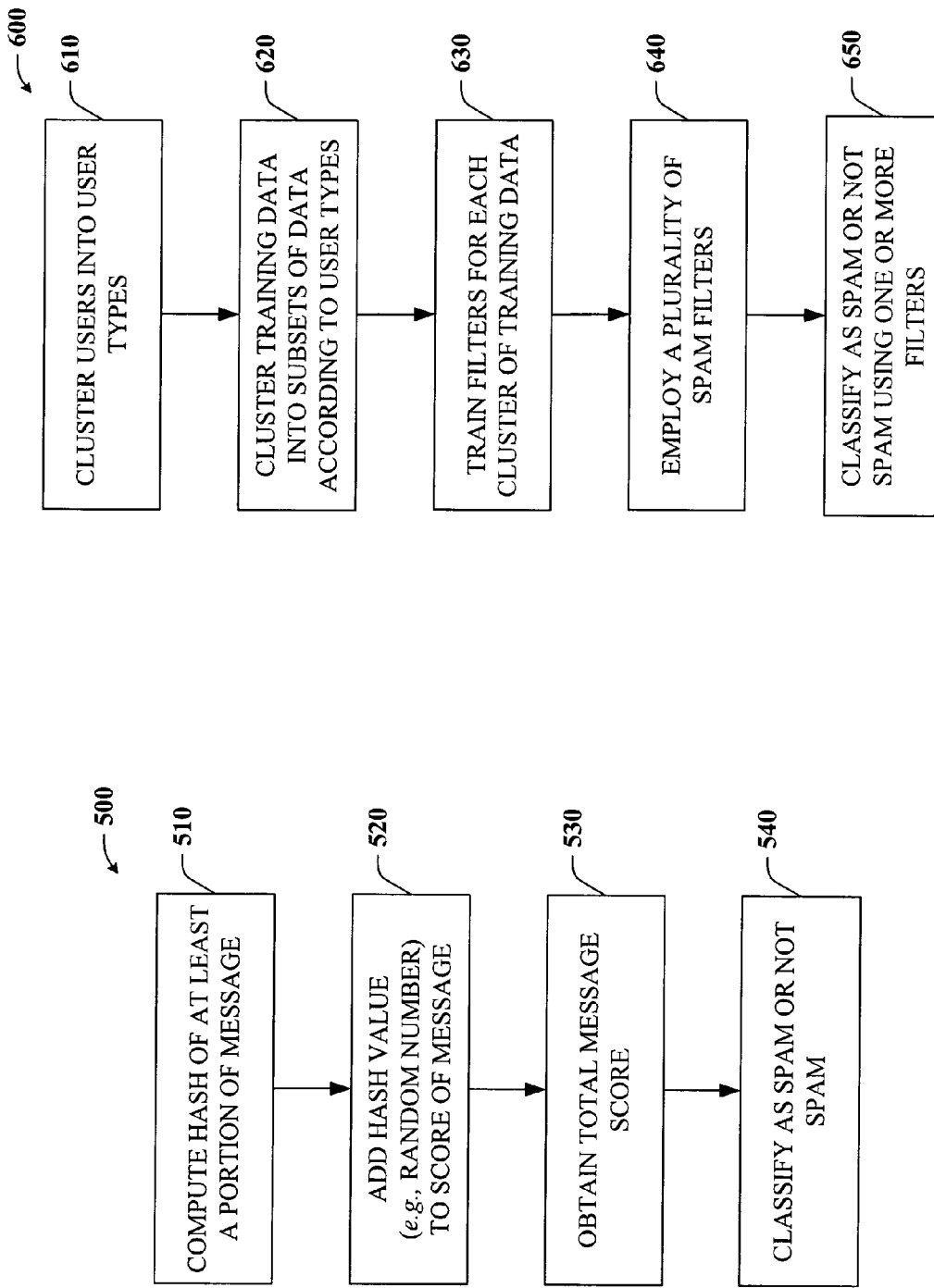
FIG. 5 is a flow diagram of an exemplary method that facilitates performing a randomization based in part on message content in accordance with an aspect of the present invention.
FIG. 6 is a flow diagram of an exemplary method that facilitates obscuring a spam filtering process by training and employing multiple spam filters in accordance with an aspect of the present invention.

Referring now to FIG. 5, a flow diagram of an exemplary process 500 for employing the message content to determine the random number added to the base score of the message is illustrated in accordance with the present invention. In particular, the process 500 can begin by computing a hash of at least a portion of the message at 510. For example, a random number can be calculated based on the message body. Thus, if another message identical to this message appears, then it is assigned the same random number or hash value. However, slight changes to the message body can result in significant changes to the score of the message. For example, spammers will try to add or delete seemingly insignificant words to messages in order to make their spam messages look less spam-like. For a relatively small percentage of their spam messages, this may be true. However, for the majority of spam messages, their spam is blocked from delivery since they do not know what types of words may increase or decrease the random number and/or the overall score of their message(s).

One alternative to hashing the message contents is computing a hash for certain features extracted from the message that substantially contribute to the score of the message. The features which substantially contribute to the score of the message can change randomly or non-randomly as well. This way, spammers are unaware and unable to run a ton of messages through to find the average and thus, to find a message that gets through no matter what features of the message are hashed. In addition a hash can be computed on the sender's IP address. Hence, the classification of the message can depend directly on at least a portion of the sender's origination information.

At 520, the random number is added to an original score or base score previously determined by the spam filter independent of the randomization. The total score of the message can then be obtained at 530; and then at 540, the message can be classified as spam or non-spam.

The randomization approach as described hereinabove in FIGS. 3-5 is merely one strategy that can be employed to hinder reverse engineering of spam filters and/or to hinder modeling of spam filter performance by spammers. Another strategy involves deploying multiple filters across multiple users and/or domains. Initially, the multiple filters can be individually trained using various subsets of training data that may or may not overlap in some way. Using multiple filters to examine and analyze messages causes the filtering system to look at different criteria in the message at essentially the same time instead of only focusing on one particular aspect of the message. Thus, when put into use, the multiple filters facilitate providing a more accurate classification of the message as well as mitigating reverse engineering of the filtering system since it would be difficult to determine which filters were used and what aspects of the message factored into the classification.

FIG. 6 demonstrates a flow diagram of an exemplary process 600 for training and employing multiple spam filters in a customized fashion based on clusters of user types. The process 600 can begin by clustering users into one or more groups according to user type, for example, at 610. At 620, the training data can be clustered in a similar manner to correspond to the clusters of user types. At 630, a plurality of filters can be individually trained for each cluster of training data. The plurality of filters is then ready to be employed at 640, whereby the filter that corresponds to a particular cluster of user type can be utilized to classify messages for that cluster. To further illustrate this, imagine that filter R is trained with cluster R training data. Users in cluster user type R can then utilize filter R to classify their messages. It should be appreciated that the training data are clustered in a similar manner as the users are clustered.

Figure 7:
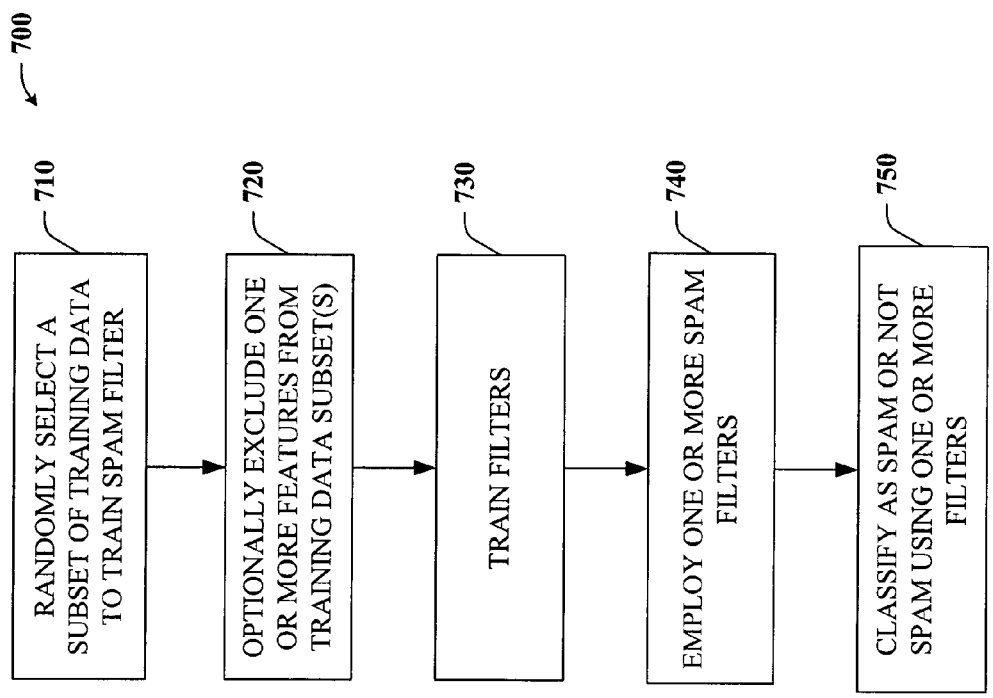
FIG. 7 is a flow diagram of an exemplary method that facilitates obscuring a spam filtering process by training and employing multiple spam filters in accordance with an aspect of the present invention.

Alternatively, a plurality of filters can be trained using various subsets of training data as shown in the exemplary process 700 of FIG. 7 (at 710). Optionally, one or more features or related data can be excluded from the one or more subsets of training data at 720. Though not demonstrated in the figure, certain features extracted from the messages can be forced to have certain values or weights. At 730, one or more spam filters are trained using respective subsets of training data; and thereafter, can be employed to process messages at 740. At 750, the messages can be classified as spam or non-spam as described hereinabove. Though not depicted in the figure, time can also be a factor to determine which spam filters are used to classify messages. In other words, particular filters may only be available during certain times of the day. Hence, filter selection can be random, non-random, based in part on the user-recipient of the message, and/or on the time of day.

Figure 8:
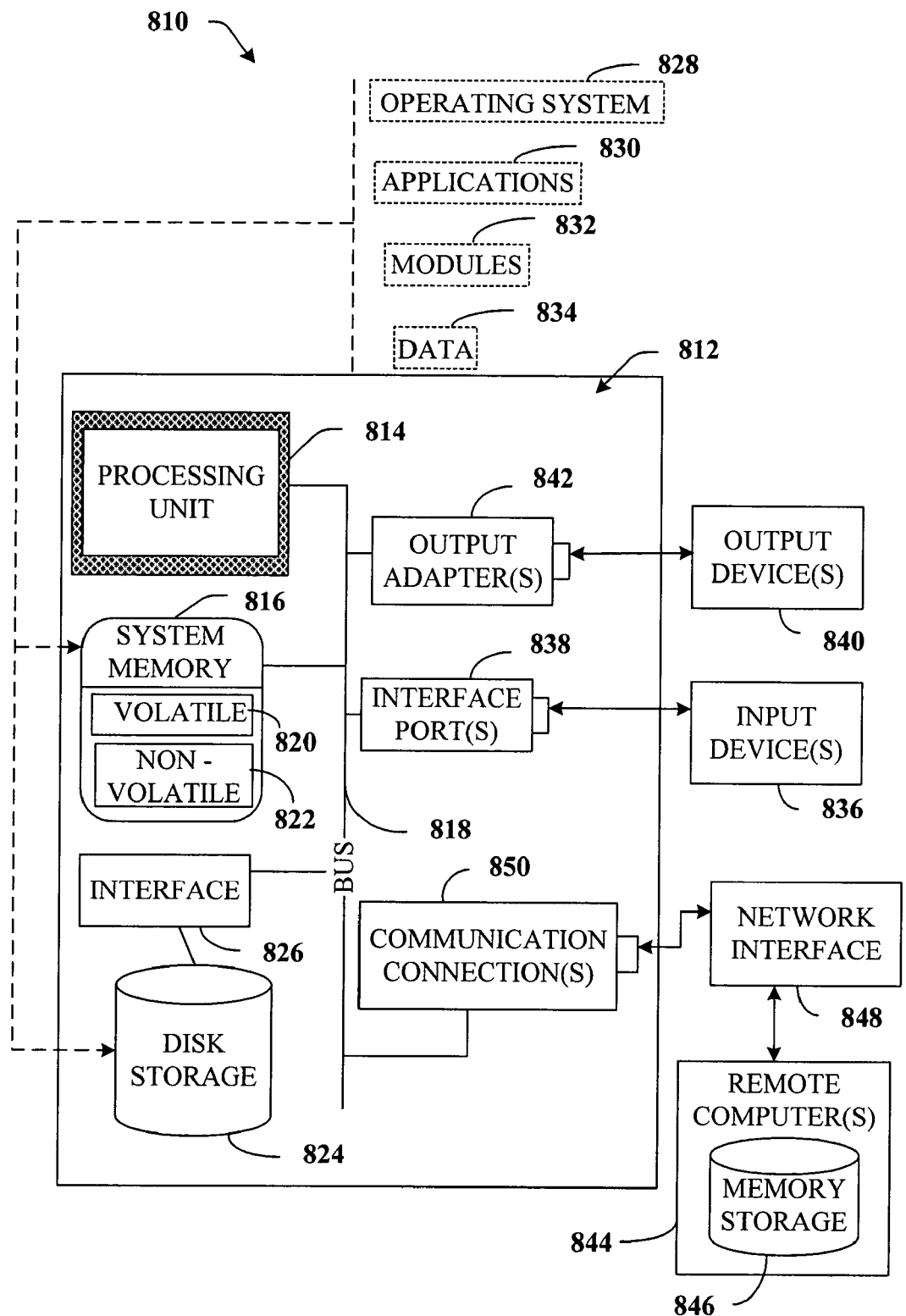
FIG. 8 is a schematic block diagram of an exemplary communication environment in accordance with the present invention.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures. etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples the system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI). Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer readable storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner. TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI). Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/ software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems. ISDN adapters, and Ethernet cards.

What has been described above includes examples of the present invention. It is., of course, not possible to describe every conceivable combination of components or methodologies for purposes of describing the present invention, but one of ordinary skill in the art may recognize that many further combinations and permutations of the present invention are possible. Accordingly., the present invention is intended to embrace all such alterations., modifications and variations that fall within the spirit and scope of the appended claims. Furthermore., to the extent that the term "includes" is used in either the detailed description or the claims, such term is intended to be inclusive in a manner similar to the term "comprising" as "comprising" is interpreted when employed as a transitional word in a claim.

What is claimed is:

1. A spam filtering system comprising:
   a computer processor;
   one or more spam filters;
   and a randomization component that randomizes scores of the filters for one or more messages based at least in part upon a hash computed to randomize the message score, the hash is computed based at least in part upon one or more features extracted from the message whose respective individual contributions to the message score exceed a threshold, thus obfuscating the functionality of the spam filter wherein the spam filtering system making use of a sigmoid function having the formula of $$finalscore = 1/1 + e^{-\hat{}summedscore}$$

wherein at least one of the summedscore value or the finalscore value is randomized to effectively modify spammer behavior and to mitigate reverse engineering of the filtering system.

2. The system of claim 1, the randomization component randomizing scores of the filter so that it is difficult for a spammer to determine whether a message that is close to a threshold and changes from being one of blocked or delivered, has changed due to one of the following: a modification to the message and the randomization component.

3. The system of claim 1, the randomization component comprising a random number generator that generates at least one of a random number and a pseudo-random number.

4. The system of claim 3, the randomization component comprising one or more input components whereby the one or more input components provide input to the random number generator to facilitate determining what random number to generate for a particular message.

5. The system of claim 1, the randomization component generating a random number based at least in part upon input received from one or more input components.

6. The system of claim 5, the input from the one or more input components is based at least in part on time.

7. The system of claim 6, wherein the random number generated depends on at least one of: a time of day and an increment of time; such that the number generated changes according to any one of: the time of day and a current increment of time.

8. The system of claim 5, the input from the one or more input components is based at least in part on at least one of: a user, a recipient, and a domain receiving the message.

9. The system of claim 8, wherein the random number generated depends on at least one of: a user, a recipient, and a domain receiving the message; such that the number generated changes according to any one of: an identity of the user, an identity of the recipient of the message, and the domain receiving the message.

10. The system of claim 9, wherein the identity of any one of the user and the recipient comprises at least one of a display name and at least a portion of an email address.

11. The system of claim 5, the input from the one or more input components is based at least in part on content of the message.

12. The system of claim 11, wherein the random number generated changes depending on at least a portion of the message content.

13. The system of claim 11, wherein the hash value is used as the random number, whereby even a small change to the message content results in a substantially large change to the random number generated.

14. The system of claim 11, wherein a hash of a sender's IP address is computed to facilitate randomizing message scores to thereby obscure the functionality of the spam filter.

15. The system of claim having a substantial effect on messages that border between spam and non-spam, whereby messages that are border-line spam are classified as spam at least part of the time by randomizing scores of the messages.

16. The system of claim 1, the randomization component mitigating spammers from finding at least one message that gets through the spam filter substantially every time it is sent.

17. A computer readable storage medium comprising computer executable instructions to carry out a method that facilitates obfuscating a spam filter comprising:
running a message through a spam filter;
computing at least one score associated with the message;
randomizing the score of the message before classifying the message as spam or non-spam by adding at least one of a random number or a pseudo-random number to the score of the message, the number added to the score of the message depending at least in part upon a hash of at least a portion of one or more features extracted from the message having respective contributions to the score greater than zero, the at least one score associated with the message comprises a finalscore and a summedscore wherein the finalscore is a sigmoid function of the summedscore having the formula of $$finalscore = \frac{1}{1 + e^{-summedscore}},$$

wherein at least one of the summedscore value or the finalscore value is randomized to effectively modify spammer behavior and to mitigate reverse engineering of the filtering system; and
classifying the message as spam or non-spam.

18. The computer readable storage medium of claim 17, wherein the summedscore is a sum of all scores associated with the one or more features extracted from a message.

19. The computer readable storage medium of claim 17, wherein the finalscore corresponds to a value between 0 and 1 that indicates a probability that a message is spare or not.

20. The computer readable storage medium of claim 17, the number added to the score of the message depending at least in part upon at least one of the following:
a time of day; and a time increment.

21. The computer readable storage medium of claim 17, the number added to the score of the message depending at least in part upon at least one of the following: a user; a recipient of the message; a domain receiving the message; a domain of the sender; and a machine name running the filter.

22. The method of claim 17, the number added to the score of the message depending at least in part upon contents of the message.

23. The computer readable storage medium of claim 17, wherein the features used to compute the hash can randomly or non-randomly change depending on at least one of a time of day and a time increment.

24. The computer readable storage medium of claim 17, the number added to the score of the message depending at least in part upon a hash of a sender's IP address.

25. The computer readable storage medium of claim 17, the number added to the score of the message depending on input from one or more input components.

26. A computer-readable storage medium having stored thereon the following computer executable components:
a randomization component that randomizes at least one score of one or more spam filters based at least in part upon a hash computed to randomize a message score, the hash is computed based at least in part upon one or more features extracted from the message whose respective individual contributions to the message score exceed a threshold, the at least one score associated with the filters comprises a finalscore and a summedscore wherein the finalscore is a sigmoid function of the summedscore having the formula of $$finalscore = \frac{1}{1 + e^{-summedscore}},$$

wherein at least one of a summedscore value or a finalscore value is randomized thus obfuscating the functionality of a the spam filters so as to hinder reverse engineering the one or more spam filters.

27. The computer-readable medium of claim 26, the randomization component comprising a random number generator that generates at least one of a random number and a pseudo-random number.

28. A system that facilitates obfuscating a spare filter comprising:
a computer processor;
a means for running a message through a spare filter; a means for computing at least one score associated with the message; a means for randomizing the score of the message by modifying the score with at least one of a random number or a pseudo-random number, the number modifying the score of the message depending at least in part upon a hash of at least a portion of one or more features extracted from the message having respective contributions to the score greater than zero: the score of the message comprises a finalscore score and a summedscore wherein the finalscore is a sigmoid function of the summedscore having the formula of finalscore=1/1+e−^summedscore wherein at least one of the summedscore value or the finalscore value is randomized before classifying the message as spare or non-spare; and a means for classifying the message as spare or non-spare.

* * * * *